US007114131B1

(12) United States Patent  
Ballantine

(10) Patent No.: US 7,114,131 B1
(45) Date of Patent: Sep. 26, 2006

(54) PRODUCT SELECTION AND TRAINING GUIDE

(75) Inventor: Joseph T. Ballantine, Madison, CT (US)

(73) Assignee: Henkel Corporation, Rocky Hill, CT (US)

( * ) Notice: Subject to any disclaimer, the term of this patent is extended or adjusted under 35 U.S.C. 154(b) by 673 days.

(21) Appl. No.: 10/139,342

(22) Filed: May 7, 2002

(51) Int. Cl.
*G06F 13/00* (2006.01)
*G06F 15/00* (2006.01)

(52) U.S. Cl. .................. 715/851; 715/854; 715/841; 705/14; 705/26

(58) Field of Classification Search ............... 715/763, 715/765, 853, 854, 840, 841, 843, 809, 810; 705/25, 26, 14, 30
See application file for complete search history.

(56) References Cited

U.S. PATENT DOCUMENTS 6,553,386 B1 * 4/2003 Alabaster ............... 707/104.1
6,587,835 B1 * 7/2003 Treyz et al. .............. 705/14
6,807,469 B1 * 10/2004 Funkhouser et al. ........ 701/33
6,856,968 B1 * 2/2005 Cooley et al. ............. 705/28
2002/0026390 A1 * 2/2002 Ulenas et al. ............. 705/27

\* cited by examiner

*Primary Examiner*—Cao (Kevin) Nguyen
(74) *Attorney, Agent, or Firm*—Steven C. Bauman

(57) ABSTRACT

A method and apparatus for providing information to a user of products, including adhesives, sealants, coatings, lubricants, cleaners, specialty chemicals and related equipment and services, comprise displaying an image of an object representing at least one application area for at least one of said products, in response to navigation over a portion of said object by a user, presenting said user with an indication that at least one product application exists for said at least one application area, and in response to an input from said user, displaying a list of said at least one product application for said application area. The information may be provided on-line, may reside locally with a user, or a portion of the information may reside locally with a user and a portion of the information may be accessed over a network.

20 Claims, 8 Drawing Sheets

PRODUCT SELECTION AND TRAINING GUIDE

FIELD OF THE INVENTION

This invention relates generally to electronic commerce and methods of electronic commerce, as well as to web sites of a type that describe goods and/or services and, more particularly, to a web site directed to providing information related to chemical formulations such as adhesives, sealants, coatings, lubricants, cleaners, specialty chemicals, applications of those formulations, and related equipment.

BACKGROUND OF THE INVENTION

An ever increasing number of enterprises are turning to communications and data exchange facilitated by web sites on the Internet. A web site not only provides a company with a vehicle for delivering a listing of its products and services, but may also provide a mechanism to offer related information, such as product descriptions, application notes, technical literature and guides for product selection and training.

Use of this technology greatly decreases the costs and increases the timeliness of conveying information. Communication over the Internet is less expensive, more timely, and more effective, than traditional communication using postal mail, facsimile, telephone, etc. As such, a web site on the Internet provides a powerful information channel, accessible to anyone in the world with the appropriate equipment, without time or geographical restrictions. A web site further offers an opportunity to provide additional presentations and marketing situations to a large audience of customers.

One common problem encountered when delivering information is the quality of user presentations. Use of a web page based presentation allows an enterprise to present information in an interactive, graphical format which can be very effective in providing a user with complicated technical information.

Accordingly, it would be desirable to provide information, such as a product selection and training guide, in a format which utilizes the advantages of a web based representation, including the ability to navigate among various graphical and text presentations.

SUMMARY OF THE INVENTION

The present invention is directed to a method and apparatus for providing information to a user of products, including adhesives, sealants, coatings, lubricants, cleaners, specialty chemicals and related equipment and services. The invention includes displaying an image of an object representing at least one application area for at least one of said products, in response to navigation over a portion of said object by a user, presenting said user with an indication that at least one product application exists for said at least one application area, and in response to an input from said user, displaying a list of said at least one product application for said application area. The information may be provided on-line, may reside locally with a user, or a portion of the information may reside locally with a user and a portion of the information may be accessed over a network.

BRIEF DESCRIPTION OF THE DRAWINGS

The above set forth and other features of the invention are made more apparent in the ensuing Detailed Description of the Invention when read in conjunction with the attached Drawings, where.

DETAILED DESCRIPTION OF THE INVENTION

Figure 1:
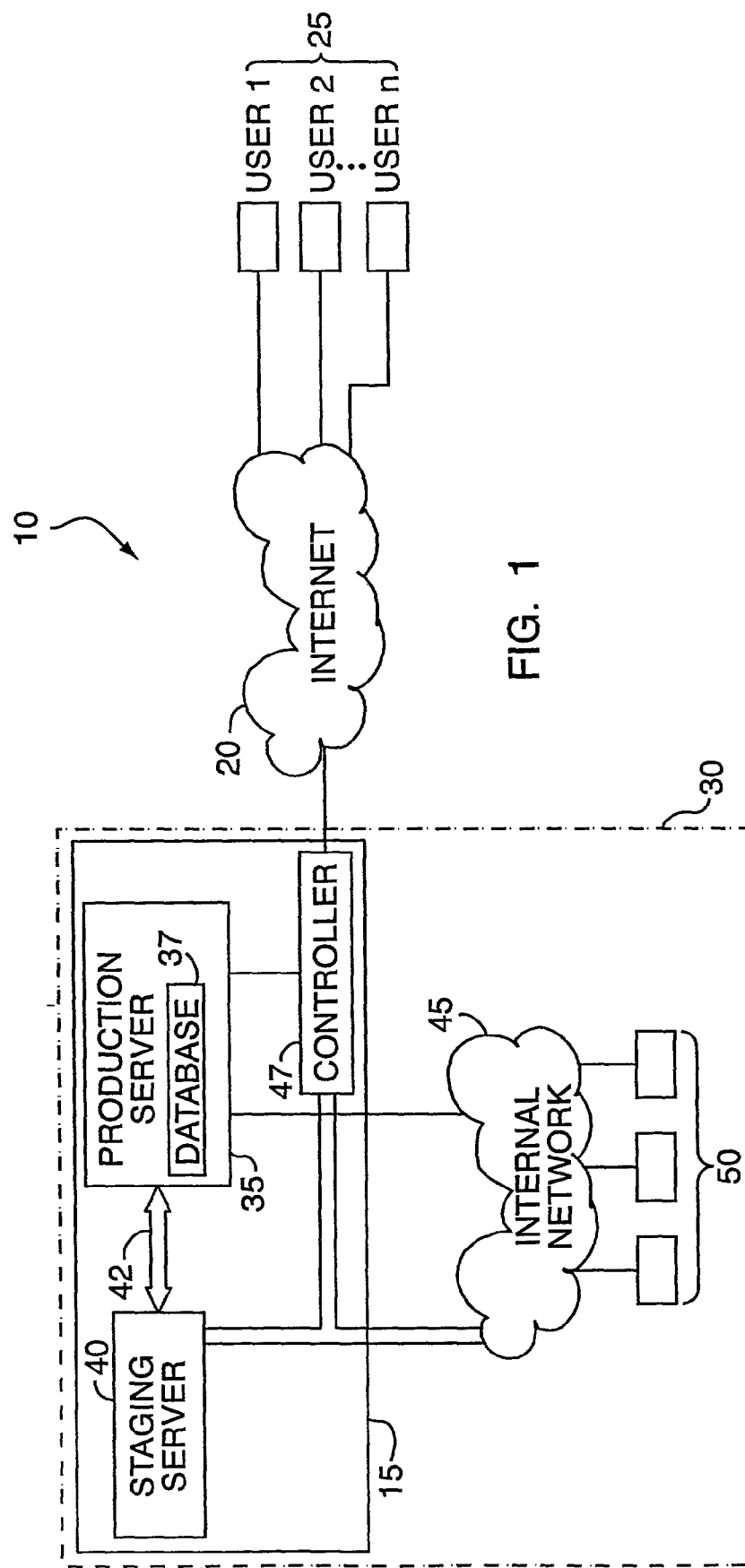
FIG. 1 is a block diagram of a system for hosting a web site in accordance with the teachings of the invention.

FIG. 1 shows an overview of a system 10 suitable for practicing the invention disclosed herein. A server 15 is preferably coupled to a data communications network which may be global in nature, for example, the Internet 20. A plurality of users 25 (user 1 through user n) are also coupled to the Internet 20. The users 25 communicate bi-directionally through the Internet 20 with the server 15, and with other devices coupled to the Internet. The users 25 and the server 15 communicate preferably by exchanging data packets using a TCP/IP protocol. Other message and data transport mechanisms may also be employed.

While one server 15 is shown, those skilled in the art will recognize that the server may represent a plurality of servers, and that these servers can be sited at one location, or they may be widely distributed and remotely sited. For example, a system may developed locally and installed on a server 15. The system may then be distributed to a plurality of servers 15 which can be used for servicing users 25 in different geographic locations, such as North America, South America, Europe, Africa, Japan and Southeast Asia. Alternatively, a single server 15 can be used for servicing all of the users 25. The server 15 could be located at an enterprise location or site 30, which could be an office of a manufacturer or provider of goods and services. The server 15 preferably also includes a production server 35, a staging server 40, and a controller 47. The production server 35 stores data representing web sites, web pages, screens and page templates, as well as other data as described below, for transmission to the users 25. In a preferred embodiment, the production server includes a database 37 of product selection and training information for transmission to the users 25.

The staging server 40 provides an environment for web site development where new web sites, web pages, and updates or revisions to current web sites and pages may be developed and tested. The staging server preferably includes a development and testing area for updates or revisions to the database 37.

The controller 47 provides an interface between the production server and the users 25, and as such, operates to provide data and navigational capabilities to the users 25 and is responsive to input and selections from the users 25. The data preferably includes any data that may be found in the staging server 40 or the production server 35, including data representing web sites, web pages, screens and page templates, graphical representations, images, various lists, application areas, product applications, and other data as described in detail below. The navigational capabilities may include the ability to traverse the various web sites, web pages, screens, etc., and the ability to move, rotate, or otherwise manipulate the images and graphical representations. Although shown as a separate component of the server 15, the controller 47 may be a part of the production server 35, the staging server 40, or any other computing device suitable for implementing the controller 47. It should be understood that the controller may be implemented as software, hardware, or a combination of software and hardware.

The production server 35 and the staging server 40 may communicate directly through link 42, or may communicate over an internal network 45 which may also provide communication with other computing devices 50 at the enterprise site 30 or other sites (not shown).

Information present on the server 15 and accessible through the internal network 45 or the Internet 20 is said to be on-line.

The global data communications network, in this example the Internet 20, and the internal network 45 may include any network suitable for communication with the users 25, for example, the Public Switched Telephone Network (PSTN), a wireless network, a wired network, a virtual private network (VPN) etc. Users 25 and computing devices 50 may communicate with the server 15 using any suitable protocol, including X.25, ATM, TCP/IP, etc.

The users 25 are assumed, for the purposes of this invention, to include a capability, such as a keyboard, mouse, touch screen, trackball, or any other mechanism for selecting or specifying an item, or for navigating through a hierarchy of related web sites, web pages and screens of on-line specialty chemical information, in particular troubleshooting information, that is presented to the users 25 from the server 15, via the Internet 20. This capability may be implemented as a personal computer (PC), a personal digital assistant (PDA), a wireless display device, or any other device capable of providing suitable selection and navigational capability.

In the presently preferred embodiment of this invention the business conducted at the enterprise location 30 is related to the provision of various formulations of chemical products, including adhesives, sealants, coatings, lubricants, cleaners, specialty chemicals, applications of those formulations, as well as related equipment and services. The related equipment includes process monitoring equipment, dispensing devices, curing systems and other equipment associated with the various chemical formulations. The services include technical guidance with respect to various uses of the products and related equipment, assembly services, including the assembly of parts for customers, and impregnation services, including impregnating porous parts with sealers for customers or otherwise providing impregnated parts. The services further include coating services, which may include applying a coating or coatings on parts. It should be understood that the related equipment and services may include any other equipment or services which may be related to the provision of various formulations of chemical products.

These various chemical formulations and the related equipment are collectively referred to hereinafter simply as "products." The web sites, web pages, screens and page templates resident in the server 15 preferably relate to these products and include technical information regarding these products, for example, technical data sheets, material safety data sheets, application notes, cost models for certain applications, etc. The information in server 15 may also include other types of technical information, literature, journal articles, issued US patent numbers, and the like that are related to the products.

While the preferred embodiment is directed to products that include adhesives, sealants, coatings, lubricants, cleaners, specialty chemicals as well as related equipment and services, other embodiments may be directed to other types of products and services.

Figure 2:
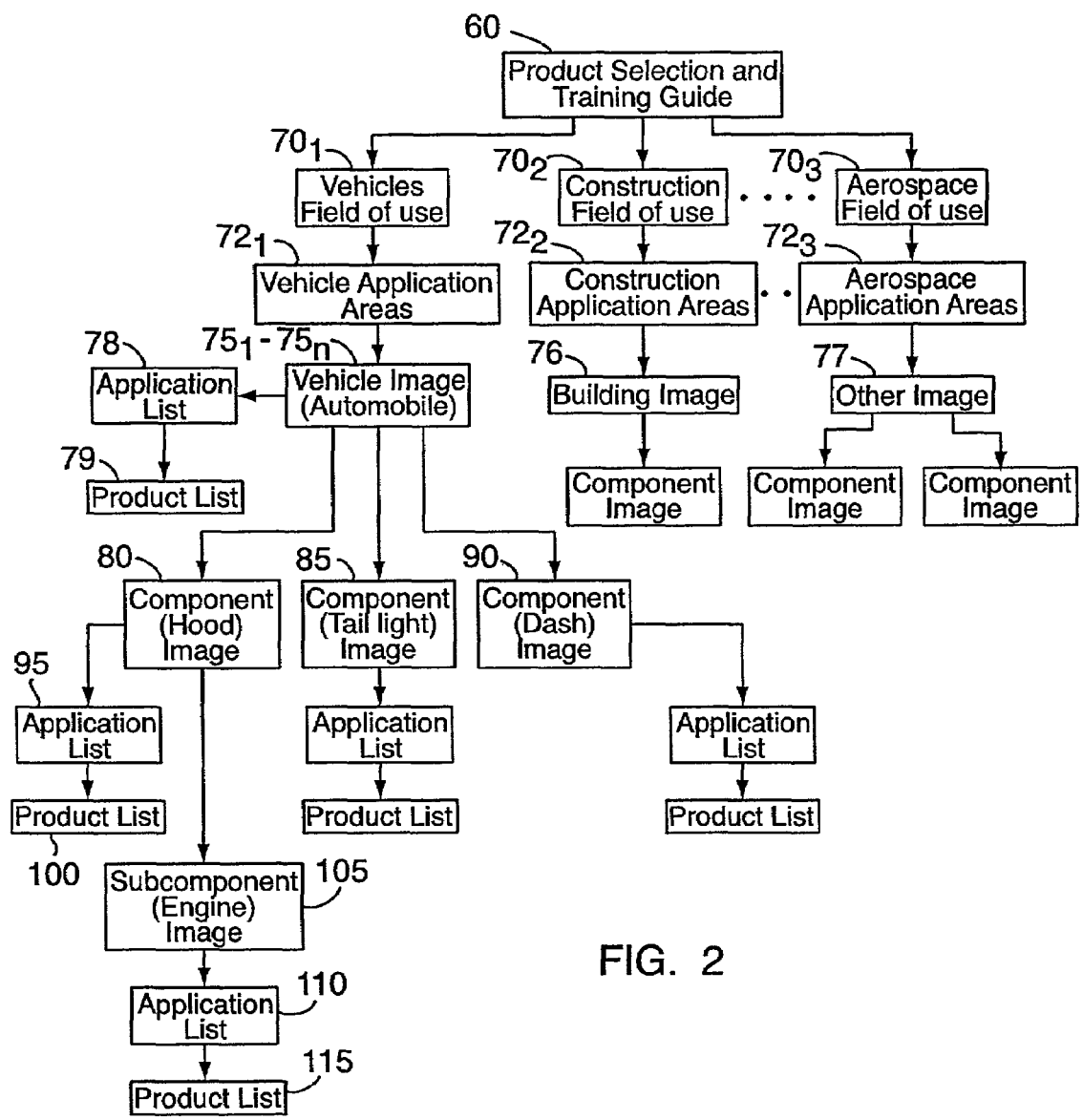
FIG. 2 shows an example of a web site with related web pages and screens, organized in a hierarchical arrangement.

In the preferred embodiment, the server 15 stores a plurality of web pages and appropriate software for implementing a web site directed in particular to providing a user 25 with a product selection and training guide related to the products. The product selection and training information therein may relate specifically to a particular product, for example, a particular hand held dispenser, or may be applicable to a class or type of product, for example, adhesive dispensers generally. As shown in FIG. 2, the web site is organized in a hierarchical manner. The web site is preferably created using web authoring tools, or software programs, such as C++, CGI Script, HTML, Java, or Visual Basic. These types of tools enable one having reasonable skill in the art to construct web sites, web pages, screens and page templates, graphical representations, images, and the like, with the functionality and navigational capabilities in accordance with the invention as described herein.

The operation of the preferred embodiment will now be described with reference to FIGS. 2 through 9.

Figure 5:
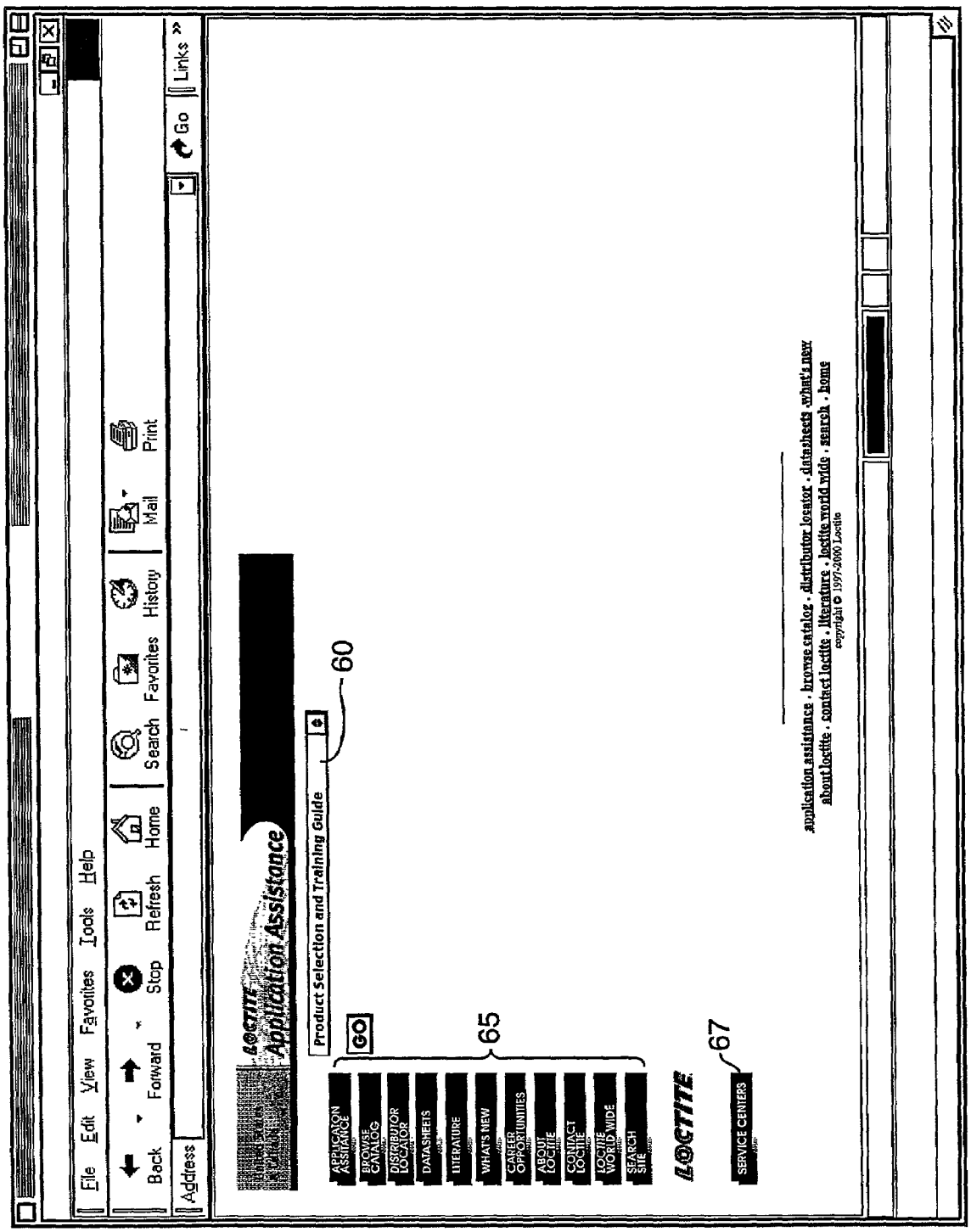
FIG. 5 depicts an initial screen encountered when entering the web site.

Upon first entering the web site, a user 25 is provided with a choice for the product selection guide 60 as shown in FIG. 5. In addition, the user 25 is presented with a number of choices 65 related generally to products, such as Application Assistance, Browse Catalog, Distributor Locator, Datasheets, Literature, etc. Additionally, the user 25 may be presented with a link 67 to service centers which preferably provide various services to the user 25, including assistance related to the use of the various formulations of chemical products, the use of the related equipment and services, ordering information and capabilities, application information, and any other service or service information related to the various formulations of chemical products and the related equipment and services.

Preferably, as the user 25 navigates through the web sites and web pages, the user 25 is presented with a consistent visual experience and, if applicable, a consistent auditory experience.

Figure 3:
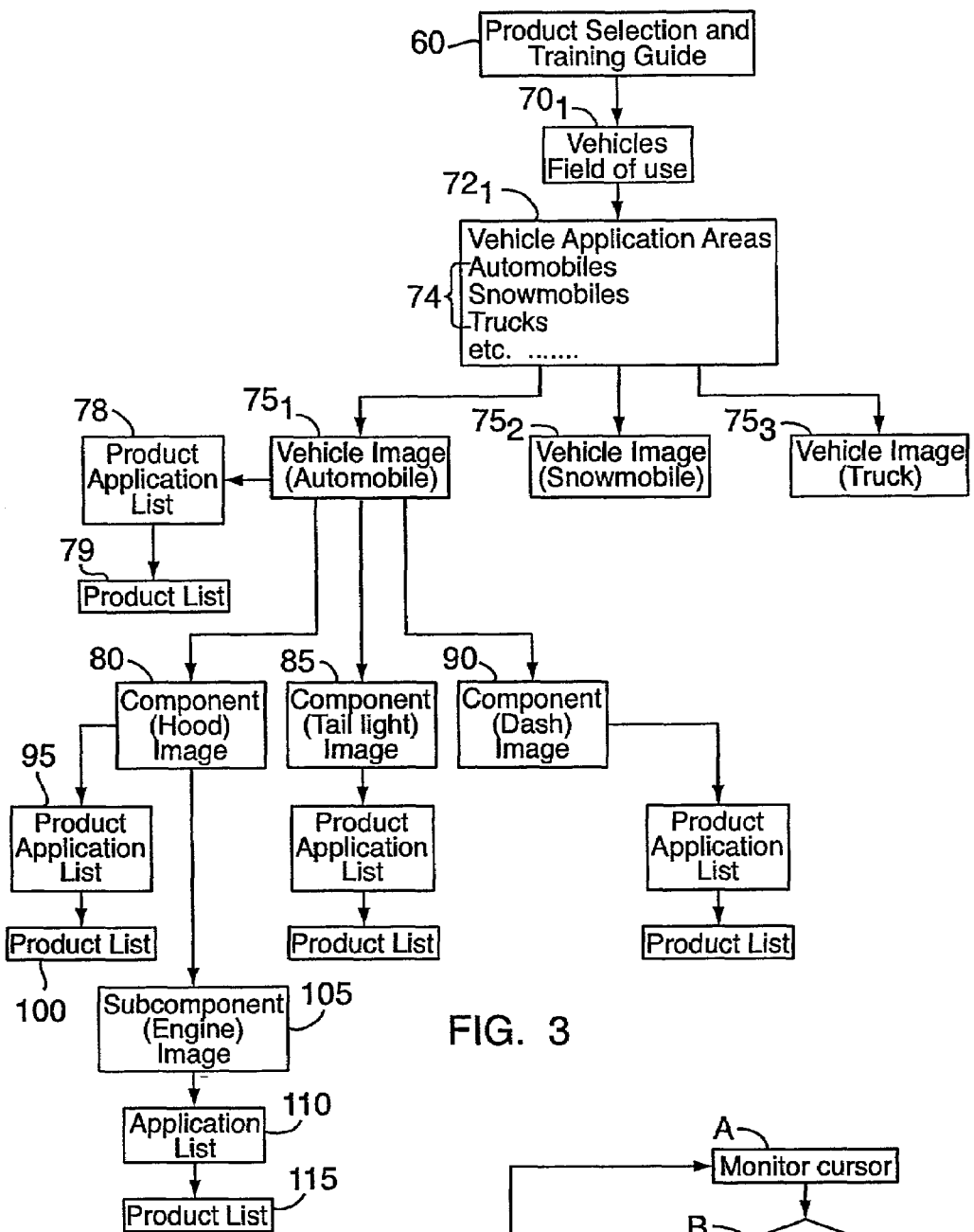
FIG. 3 shows a more detailed view of a portion of FIG. 2.

FIG. 3 shows a more detailed view of a portion of FIG. 2. Upon selecting the product selection guide 60, the user then enters a lower level of the hierarchical structure of the web site and may be prompted to select from at least one field of use $70_1$–$70_n$, for example, vehicles, construction, manufacturing, aerospace, etc. Upon selection of a field of use 70, the user 25 enters a still lower level of the hierarchy and is presented with a list of application areas $72_1$–$72_n$, within the selected field of use 70. For example, upon selecting the manufacturing field of use, a user may be presented with a list of application areas including assembly of compact disks, digital versatile disks, medical devices, laminated dichromic materials, speakers, writing instruments, etc.

As an example of a preferred embodiment, upon selecting the vehicles field of use $70_1$, the user may be presented with a list of vehicle types 74 as application areas $72_1$. The vehicle types 74 may include automobiles, snowmobiles, trucks, etc. Upon selecting a vehicle type 74, an image representing that vehicle type $75_1$–$75_n$, such as an automobile $75_1$, a snowmobile $75_2$, a truck $75_3$, etc. may be displayed. The image $75_1$–$75_n$ may be rotatable about one or more axes simultaneously so as to present at least one view of the image to the user. The view may be one, or a combination of a number of views including cross sectional, elevational, exploded, etc. In this example, the vehicle $75_1$–$75_n$ may rotate automatically as part of its presentation to a user, or the user may control the rotation, for example by positioning a cursor, or by typing a command. The user may be able to select or control various aspects of the presentation including, for example, the axes of rotation, the speed of rotation, etc. The vehicle $75_1$–$75_n$ is not limited to a particular type or number of representations, but may include an automobile, a snowmobile, a truck, a motorcycle, a bicycle, a train car, an aircraft, a boat, excavation equipment, farm machinery, etc. In addition, the images 75, 76, 77 are not limited to vehicles, but may be any image or number of images related to the fields of use $70_1$–$70_n$. As further non limiting examples, the images could also include a building 76, a compact disk, a digital versatile disk, a piece of machinery, an assembly, a printed circuit board, a semiconductor package, a medical device, a dichromic mirror, a speaker, a writing instrument, or other article of manufacture, or any other representation for showing possible applications of the products.

Figure 4:
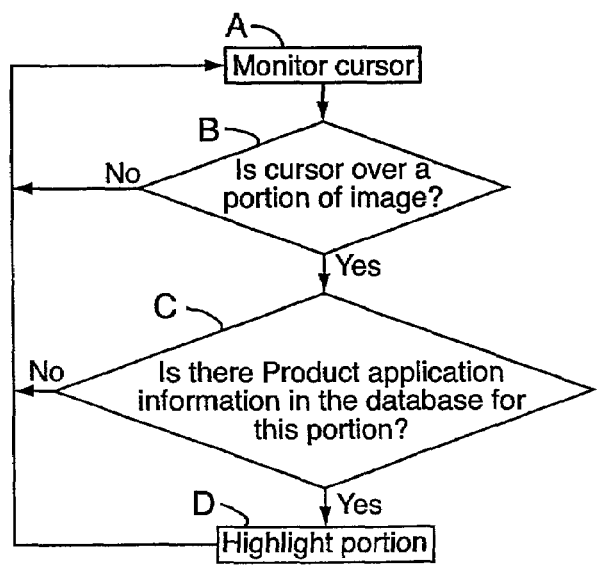
FIG. 4 shows a flow diagram depicting the logic for highlighting a portion of a displayed image.

In a preferred embodiment, as the user 25 navigates over the image 75, 76, 77, various parts of the image 75, 76, 77 are highlighted, preferably indicating that product applications exist for those parts. A flow diagram showing an example of such an implementation is shown in FIG. 4. In step A of FIG. 4, the controller 47 (FIG. 1) monitors the location of a cursor controlled by the user 25 using the navigation capabilities mentioned above. In step B, if the controller detects that the cursor is over a portion of the image 75, 76, 77, the controller determines whether there is product application data in the database 37 (FIG. 1) for that portion of the image, as shown in step C. If the database 37 includes data for that portion of the image the controller causes that portion of the image to be highlighted as shown in step D.

Returning to FIG. 3, upon selecting a highlighted area, the user may be presented with a list of product applications 78. Upon selection of a particular product application, a list of products 79 appropriate for the product application is displayed. A user may then select a product from the product list and preferably a video may be displayed showing step by step instructions regarding the use of the product for the application.

Figure 6:
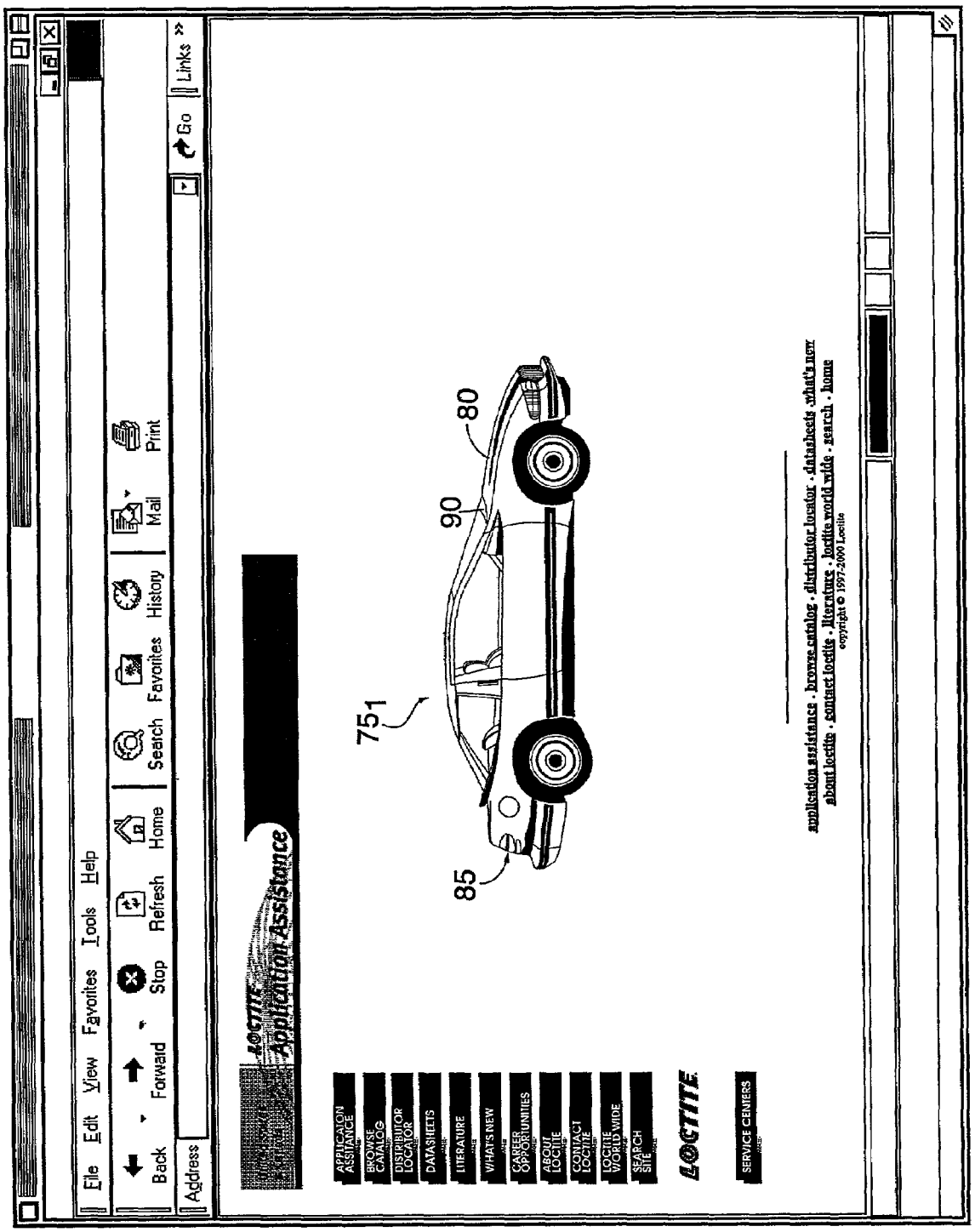
FIG. 6 portrays an image representing an application area, shown as a vehicle.

As the image, such as the automobile $75_1$ in the example of FIG. 3, is displayed, the user 25 is preferably provided with the capability to select various components 80, 85, 90 of the automobile $75_1$ as shown in FIG. 6. Upon selection of a particular component, the user is presented with a list of product applications for that particular component. Alternatively, a user may also be presented with an image of an object representing at least one subcomponent of the component.

Figure 7:
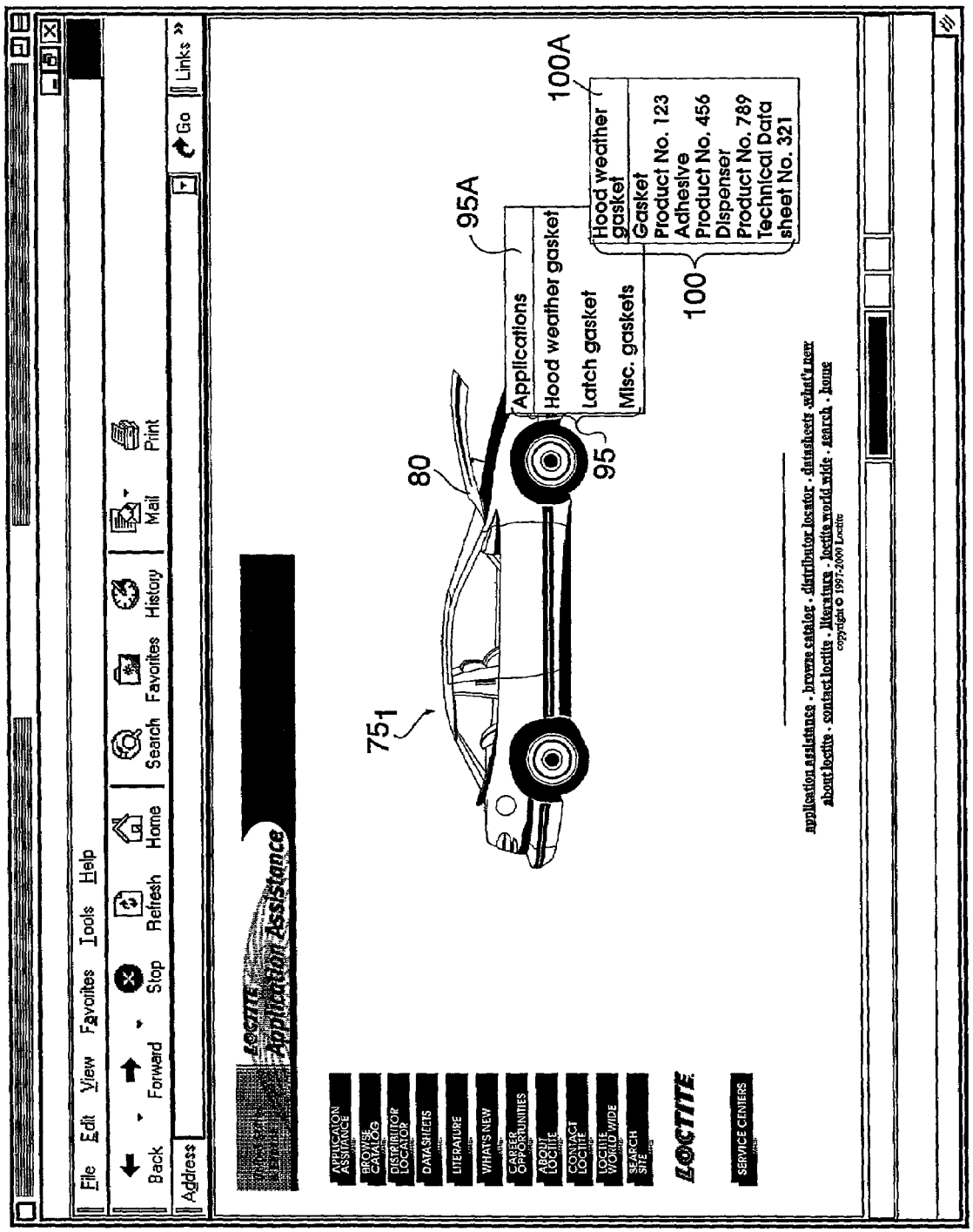
FIG. 7 represents a screen showing the vehicle of FIG. 4 and an associated applications list and products list.

Still referring to FIG. 6, the user 25 may select a component such as the hood 80, a tail light assembly 85, or the dashboard 90 of the automobile $75_1$. Other examples of automobile components could include an outside or inside rear view mirror, a windshield, various body panels, etc. Assuming the user selects the hood 80, as shown in FIG. 7, an product applications list 95 may be displayed preferably as a "pop up window" 95A, listing the product applications for the hood 80 area of the automobile $75_1$ (such as hood weather gasket, latch gasket, etc.). A user may then select one of the product applications 95 shown in the pop up window 95A and be presented with another pop up window 100A with further information 100, such as a list of products appropriate for the selected product application, including dispensing equipment, and additional information for example, technical data sheets, material safety data sheets, cost models for the application, etc.

In a preferred embodiment, as the user 25 navigates over the hood 80, various areas of the hood 80 are highlighted, indicating an application for the products. By selecting a highlighted area, the user may again be presented with a product applications list 95, or a list of products 100 appropriate for a particular product application.

Figure 8:
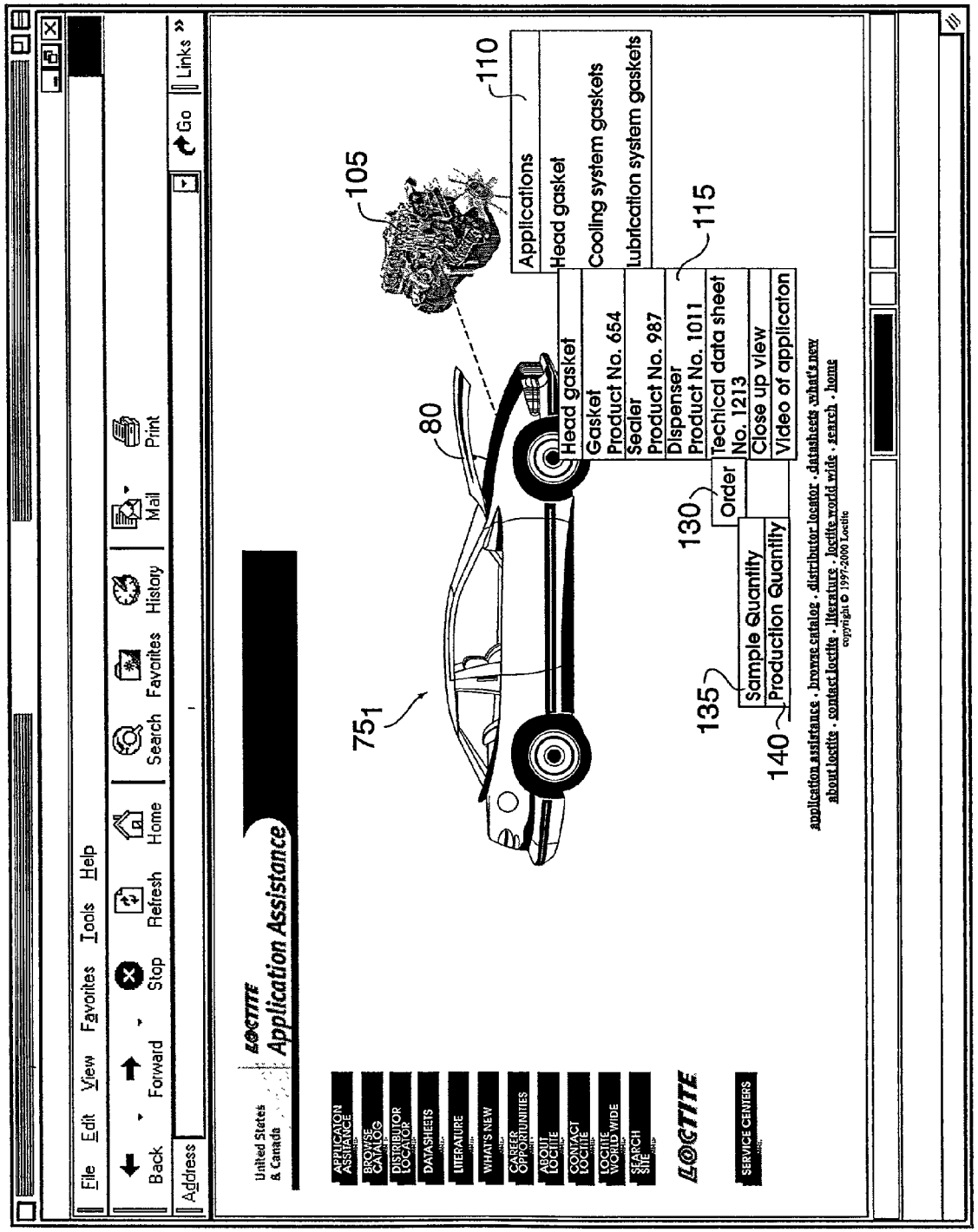
FIG. 8 shows a subcomponent of the vehicle and an associated applications list and products list.
Figure 9:
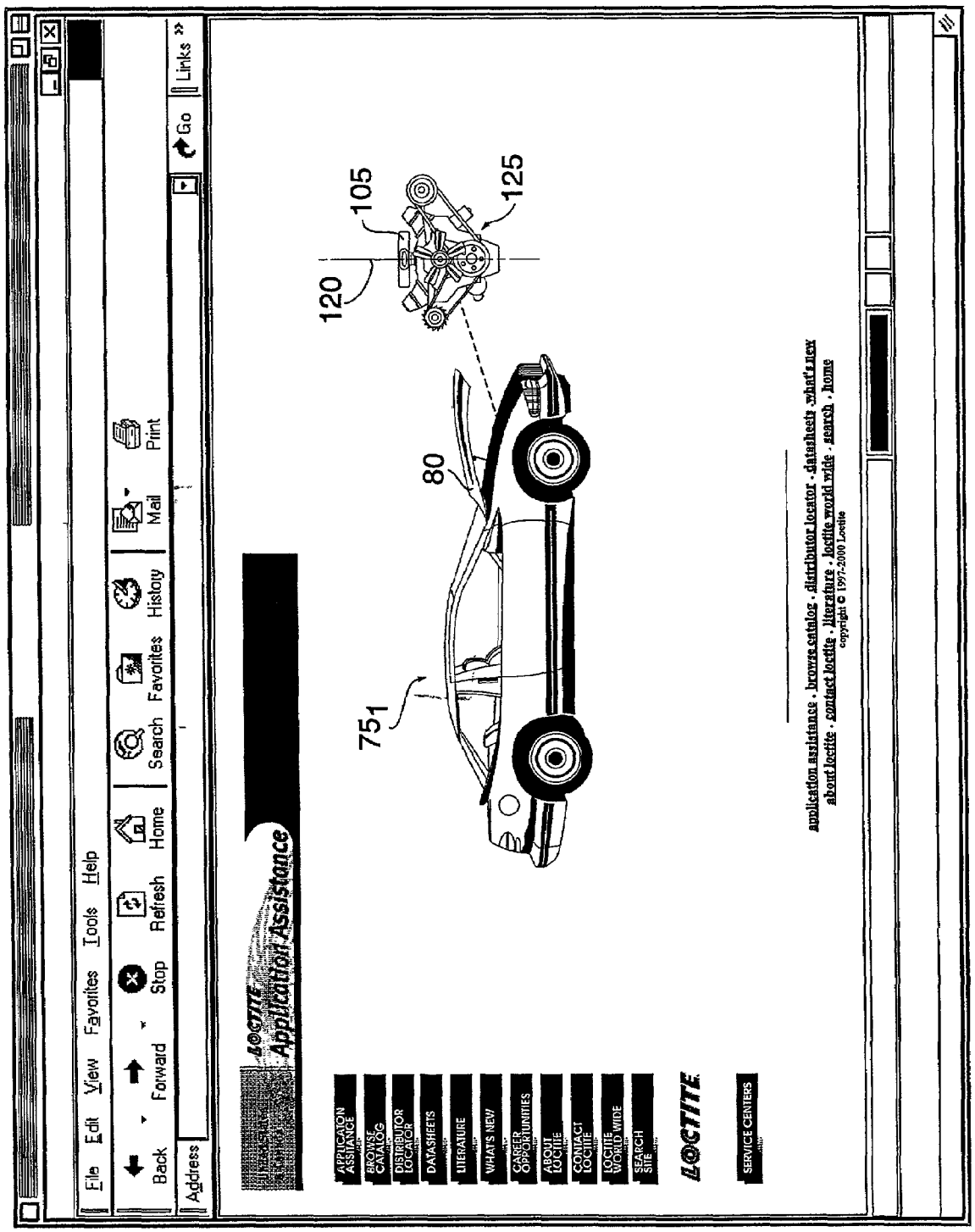
FIG. 9 shows a rotated view of the subcomponent.

Alternatively upon selection of the hood 80, an image of an object representing a subcomponent of that area of the automobile $75_1$, for example, the engine 105 may be displayed. As with the hood 80, if the user 25 selects the image of the engine 105, as shown in FIG. 8, a product applications list 110 may be displayed preferably as a "pop up window", listing the product applications for the engine 105. A user may then select one of the product applications shown in the pop up window and be presented with further information 115, such as a list of products appropriate for the application, including dispensing equipment, and additional information for example, technical data sheets, material safety data sheets, cost models for the application, etc. As the user 25 navigates over the image of the engine 105, various areas of the engine 105 may be highlighted, indicating an application for the products. By selecting a highlighted area, the user may again be presented with the product applications list 110, or the list of products 115 appropriate for the application. The image of the engine 105 may be rotatable about one or more axes simultaneously so as to present at least one view of the engine 105 where the products may have application. The view may be one, or a combination of a number of views, including cross sectional, elevational, exploded, etc. The image of the engine 105 may rotate automatically as part of its display, or the user may control the rotation, for example by positioning a cursor, or by typing a command. FIG. 9 shows the engine 105 rotated 90 degrees about axis 120, allowing the user 25 to view a belt area 125 located on the front of the engine 105.

It is apparent that by navigating through the hierarchy of web pages and screens, the user 25 is presented with various fields of use $70_1$–$70_n$ for the products, application areas (e.g. vehicles $75_1$) within those fields of use $70_1$–$70_n$, product application lists 78, 95, 110, and lists of products 79, 100, 115 for particular product applications. The various web pages contribute to provide various aspects of product selection and training related to the products of the enterprise 30. By navigating through the web pages, the user 25 may learn the characteristics and the appropriate applications for the products. The web pages may be tailored or customized for a particular application area, for example, a particular vehicle make and model may be represented along with specific components and subcomponents. Product application lists and lists of products specific to the particular component could be shown. As mentioned above, upon selection of a product from the product list 100, 115, the user 25 may view a video showing step by step instructions regarding the use of the product for a specifically tailored application. Thus the user 25 may be trained in various aspects of the products, for example, proper selection, application, and use of the products.

Additionally, when a user is presented with a product list 100, 105, the user may also be presented with an opportunity to place an order for a product, including an order of a sample quantity or a production quantity of a product. For example, upon selection of a particular product from the product list 115 in FIG. 8, a user may further select an ordering option 130 and then choose between sample quantities 135 and production quantities 140.

It should be understood that access to the web site has been discussed in the context of Internet access, the web site may be also be accessed over the internal network 45.

While discussed in the context of a web site resident on a server, to avoid bandwidth limitations that may exist in the field, one embodiment of the product selection and training guide may be implemented as a system including a CD, DVD, hard drive, local storage device, or other technique where all of the information may reside locally with the user 25. In another embodiment, some information may reside locally with the user 25 and additional information may be accessed over a network such as the internal network 45 or the Internet 20, from the web site as required.

In a further preferred embodiment, the user 25 may also access case histories and testimonials related to the use of the products in the field. These may include user's experiences with actual applications of the products with specific ones of the fields of use and specific application areas.

As should be apparent, the number of levels of the hierarchical web site need not be fixed, but may be determined by factors such as the information available for the products, the types of applications, and the number of known types of common problems experienced by users and their solutions.

It should be apparent that the foregoing description has been made in the context of presently preferred embodiments of this invention, and thus the various specifically described web site choices and selections, such as Application Assistance; Browse Catalog; Distributor Locator; Datasheets; Literature; etc., the various technical support choices, such as Adhesive Support and Equipment Support; the various troubleshooting topics; and the troubleshooting advice; are all exemplary, and are not to be construed in a limiting sense upon the teachings found herein.

Also, while the invention has been described primarily in the context of chemical formulations and equipment, as mentioned above, the teachings of this invention relate as well to other products or services, including other types of manufactured goods, commodities, etc.

Thus, while the invention has been particularly shown and described with respect to preferred embodiments thereof, it will be understood by those skilled in the art that changes in form and details may be made therein without departing from the scope and spirit of the invention, which is defined by the claims.

What is claimed is:

1. A method for providing information to a user of products, including adhesives, sealants, coatings, lubricants, cleaners, specialty chemicals and related equipment and services, comprising the steps of:
   displaying an image of an object representing at least one application area for at least one of said products;
   in response to navigation over a portion of said object by a user, presenting said user with an indication that at least one product application exists for said at least one application area; and
   in response to an input from said user, displaying a list of said at least one product application for said application area.

2. The method of claim 1, further comprising the step of displaying a list of at least one product for said one of said product applications in response to a selection of one of said product applications.

3. The method of claim 1, wherein said image is rotatable about at least one axis so as to present at least one view of the image to the user having said at least one product application.

4. The method of claim 3, wherein the rotation of said image is controllable by the user.

5. The method of claim 1, wherein said information further comprises training information related to the use of said products.

6. The method of claim 1, wherein said at least one application area comprises vehicles.

7. The method of claim 6, wherein said at least one application area comprises a vehicle type selected from the group of automobiles, snowmobiles, trucks, motorcycles, bicycles, train cars, aircraft, boats, excavation equipment, and farm machinery.

8. The method of claim 1, wherein said information is provided on-line.

9. The method of claim 1, wherein said information resides locally with a user.

10. The method of claim 1, wherein a portion of said information resides locally with a user and a portion of said information is accessed over a network.

11. The method of claim 1, wherein said information further comprises a link to service centers which provide services to the user.

12. The method of claim 1, further comprising providing a user with the ability to order a quantity of said at least one of said products.

13. The method of claim 1, wherein said object represents an item to which the product may be applied.

14. A method for providing information on-line to a user of products, including adhesives, sealants, coatings, lubricants, cleaners, specialty chemicals and related equipment and services, comprising the steps of:
   providing product information including product selection and training information related to the use of said products;
   displaying an image of an object representing at least one application area for at least one of said products; and
   in response to navigation over a portion of said object by a user, presenting said user with an indication that at least one product application exists for said at least one application area; and
   in response to an input from said user, displaying a list of said at least one product application for said application area.

15. A server for providing information on-line to a user of products, including adhesives, sealants, coatings, lubricants and cleaners, and related equipment and services, comprising:
   a web site organized as a hierarchy of related web pages and screens, said information including product selection information related to the use of said products, accessible to said user by navigating through said web site; and
   a controller for displaying an image of an object representing at least one application area for at least one of said products and for presenting a user with an indication that at least one product application exists for said at least one application area in response to navigation over a portion of said object by a user, and for displaying a list of said at least one product application for said application area upon input from a user.

16. The server of claim 15, wherein said controller further operates to display a list of at least one product for said one of said product applications in response to a selection of one of said product applications.

17. The server of claim 15, wherein said controller further operates to rotate said image about at least one axis so as to present a view of the image to the user having said at least one product application.

18. The server of claim 17, wherein said controller further operates to allow the user to control the rotation of said image.

19. The server of claim 15, wherein said information further comprises training information related to the use of said products.

20. A method for providing information to users of products, including adhesives, sealants, coatings, lubricants, cleaners, specialty chemicals and related equipment and services, comprising the steps of:

developing a system for providing said information online, wherein said system operates to display an image of an object representing at least one application area for at least one of said products and in response to navigation over a portion of said object by a user, operates to present a user with an indication that at least one product application exists for said at least one application area, said system further operating to display a list of said at least one product application for said application area upon input from a user;

installing said system on a first server for providing information to a first user; and distributing said system to a second server for providing said information to a second user in a different geographical area.

* * * * *